(12) United States Patent
Folgar (10) Patent No.: US 9,540,279 B2
(45) Date of Patent: Jan. 10, 2017

(54) METHOD OF PRODUCING GLASS-CERAMIC

(71) Applicant: Corning Incorporated, Corning, NY (US)

(72) Inventor: Carlos Eduardo Folgar, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 107 days.

(21) Appl. No.: 14/278,535

(22) Filed: May 15, 2014

(65) Prior Publication Data

US 2014/0345328 A1 Nov. 27, 2014

Related U.S. Application Data

(60) Provisional application No. 61/827,198, filed on May 24, 2013.

(51) Int. Cl.
| | |
|---|---|
| *C03B 32/02* | (2006.01) |
| *C03C 23/00* | (2006.01) |
| *C03C 10/00* | (2006.01) |
| *C03C 3/093* | (2006.01) |
| *C03B 29/02* | (2006.01) |

(52) U.S. Cl.
CPC .......... *C03C 23/0065* (2013.01); *C03B 29/02* (2013.01); *C03B 32/02* (2013.01); *C03C 3/093* (2013.01); *C03C 10/0027* (2013.01); *C03C 2204/04* (2013.01)

(58) Field of Classification Search
CPC ........ C03B 32/02; C03B 27/012; C03B 5/023; C03B 17/067; C03B 29/02; C03C 3/083; C03C 3/076; C03C 3/085; C03C 23/0065
See application file for complete search history.

(56) References Cited

U.S. PATENT DOCUMENTS

| | | | | |
|---|---|---|---|---|
| 3,715,220 A | * | 2/1973 | Confer | ............... C03B 19/06 264/638 |
| 3,812,689 A | | 5/1974 | Reade | ............... 65/33 |

(Continued)

FOREIGN PATENT DOCUMENTS

| | | |
|---|---|---|
| CN | 100443616 | 12/2008 |
| EP | 0358827 | 3/1990 |

(Continued)

OTHER PUBLICATIONS

European Patent Office; International Search Report; Mail Date: Sep. 12, 2014; pp. 2-6.

(Continued)

*Primary Examiner* — Jodi C Franklin
(74) *Attorney, Agent, or Firm* — John T. Haran (57) ABSTRACT

A method of producing glass-ceramic includes providing a glass made from a glass composition comprising $LiO_2$, $Al_2O_3$, $SiO_2$, and at least one nucleating agent. The glass is disposed in a microwave processing chamber. Microwaves are then selectively delivered into the microwave processing chamber at varying frequencies to induce different distributions of microwave fields in the glass. The glass is nucleated and crystallized while under the influence of the induced microwave fields.

9 Claims, 4 Drawing Sheets (56) References Cited

U.S. PATENT DOCUMENTS

| | | | | |
|---|---|---|---|---|
| 4,042,362 | A * | 8/1977 | MacDowell | C03C 10/00 501/10 |
| 4,126,477 | A * | 11/1978 | Reade | C03C 10/0027 501/10 |
| 4,239,521 | A * | 12/1980 | Beall | C03C 10/0027 65/114 |
| 4,341,872 | A * | 7/1982 | MacDowell | C03C 10/0027 501/6 |
| 4,714,810 | A * | 12/1987 | Sirkis | H05B 6/686 219/693 |
| 6,408,649 | B1 | 6/2002 | Sklyarevich et al. | 65/102 |
| 2003/0099062 | A1 * | 5/2003 | Kataoka | C03C 10/0027 360/99.12 |
| 2003/0218001 | A1 * | 11/2003 | Siebers | C03C 4/02 219/452.11 |
| 2004/0198579 | A1 * | 10/2004 | Horsfall | C03C 3/085 501/4 |
| 2007/0126082 | A1 * | 6/2007 | Bairo | H01L 29/1004 257/587 |
| 2007/0235450 | A1 * | 10/2007 | Quantrille | A23L 1/0128 219/730 |
| 2007/0259767 | A1 * | 11/2007 | Siebers | C03C 1/002 501/59 |
| 2008/0283153 | A1 * | 11/2008 | Zurecki | H05H 1/48 148/217 |
| 2011/0031238 | A1 * | 2/2011 | Segawa | C04B 35/64 219/702 |
| 2012/0080425 | A1 * | 4/2012 | Jussel | A61C 13/203 219/756 |
| 2012/0086153 | A1 * | 4/2012 | Kudo | B01J 35/04 264/432 |
| 2012/0161273 | A1 * | 6/2012 | Fujieda | C03B 32/02 257/467 |
| 2012/0291493 | A1 * | 11/2012 | Hsu | C03B 5/245 65/33.9 |
| 2013/0233847 | A1 * | 9/2013 | Lee | H05B 6/64 219/678 |
| 2013/0274085 | A1 * | 10/2013 | Beall | C03C 14/00 501/32 |

FOREIGN PATENT DOCUMENTS

| | | |
|---|---|---|
| JP | 4349131 | 12/1992 |
| JP | 04438381 | 3/2010 |
| TW | 201024242 | 7/2010 |

OTHER PUBLICATIONS

Mahmoud et al.; "High Frequency Microwave Processing of Lithium Dilsilicate Glass-Ceramic"; Processing and Properties of Advanced Ceramics and Composites IV: Ceramic Transactions, vol. 234, Jan. 1, 2012; pp. 115-121.

Gaillard et al.; "Traitements Thermiques Micro-Ondes de Vitroceramiques de Type "LAS""; ANN. CHIM. FR., vol. 21, Jan. 1, 1996; pp. 145-146.

Clark et al.; "Processing Materials With Microwave Energy"; Materials Science and Engineering A287 (2000); pp. 153-158.

Li et al.; "Nanocrystallization of $Fe_{73}Si_7B_{17}Nb_3$ metallic glass induced by microwave treatment in magnetic field of a single mode 915 MHz applicator"; Journal of Alloys and Compounds 536S (2012); pp. S315-S318.

Mahmoud et al.; "Crystallization of Lithium Disilicate Glass Using Microwave Processing"; Journal of the American Ceramic Society 95 (2012); pp. 579-585.

Das et al; "Crystallization of Glass Coating by Microwave Heating", Transactions of the Indian Ceramic Society, vol. 67, Issue 3, 2008, pp. 139-146.

Mahmoud et al; "Variable Frequency Microwave (VFM) Processing: A New Tool to Crystallize Lithium Disilicate Glass", Ceramic Engineering and Scinece Proceedings, vol. 27, Issue 6, 2006, pp. 143-153.

Morsi Mohamed Mahmoud; "Crystallization of Lithium Disilicate Glass Using Variable Frequency Microwave Processing"; Dissertation Submitted to the Faculty of the Virginia Polytechnic Institute and State University; April 24, 2007; 215Pages.

* cited by examiner

METHOD OF PRODUCING GLASS-CERAMIC

This application claims the benefit of priority under 35 U.S.C. §119 of U.S. Provisional Application Ser. No. 61/827,198, filed on May 24, 2013, the content of which is relied upon and incorporated herein by reference in its entirety.

FIELD

This disclosure relates to production of glass-ceramics in the $SiO_2$—$Al_2O_3$—$Li_2O$ system.

BACKGROUND

Glass-ceramics in the $SiO_2$—$Al_2O_3$—$Li_2O$ system are characterized by low thermal expansion over a wide temperature range and silica concentrations. These glass-ceramics have a β-quartz solid solution or a β-spodumene solid solution as a main crystalline phase. The β-spodumene phase is known to be mechanically strong with near zero thermal expansion. High mechanical strength and low thermal expansion combined with other properties such as low dielectric loss make these glass-ceramics suitable for consumer electronics and other technical applications. The glass-ceramics are typically white in color or transparent. Consumer electronics applications typically require materials with color variation within a short range.

Glass-ceramics are formed by controlled nucleation and crystallization of glass having a desired composition. Nucleation involves heating the glass to a nucleation temperature and allowing the glass to soak at the nucleation temperature, during which crystal nuclei develop in the glass. Crystallization involves further heating the glass to a crystallization temperature and allowing the glass to soak at the crystallization temperature, during which crystals grow and precipitate in the glass. The resulting glass-ceramic is then cooled to room temperature. The properties of the glass-ceramic will depend on the glass composition, the nucleation and crystallization parameters, and the glass-ceramic microstructure.

Conventional techniques for producing glass-ceramics use resistive heating furnaces for both nucleation and crystallization. The total processing cycle normally takes from 7 to 10 hours when resistive heating is used for nucleation and crystallization. Aside from long processing times, resistive heating requires substantial input energy. With resistive heating, the processing chamber has to be maintained at a uniform temperature to minimize variations in color and microstructure of the glass-ceramic. This means that much of the input energy is directed to heating the volume of the processing chamber that is not occupied by the glass being processed. Where furniture is used to support several samples inside the processing chamber, i.e., for high volume production, substantial energy is also lost to heating of the furniture.

SUMMARY OF INVENTION

This disclosure describes a faster and more energy efficient method of producing glass-ceramics in the $SiO_2$—$Al_2O_3$—$Li_2O$ system with comparable color control and microstructure control to conventional resistive heating techniques.

In summary, a method of producing a glass-ceramic involves providing a glass made from a glass composition comprising $LiO_2$, $Al_2O_3$, $SiO_2$, and at least one nucleating agent. The glass is disposed in a microwave processing chamber. Microwaves are then selectively delivered to the microwave processing chamber at varying frequencies to induce different distributions of microwave fields in the glass. The glass is first heated to a nucleation temperature under the influence of the induced microwave fields. The glass is maintained at the nucleation temperature under the influence of the induced microwave fields for a time period during which crystal nuclei develop in the glass. Next, the glass is heated to a crystallization temperature under the influence of the induced microwave fields. The glass is maintained at the crystallization temperature under the influence of the induced microwave fields for a time period during which at least one crystal phase grows in the glass, resulting in the glass-ceramic. The glass-ceramic is then cooled from the crystallization temperature to room temperature.

In the method summarized above, microwave energy is focused mainly on the glass being processed. If it is desirable, other components can be introduced into the microwave processing chamber with different dielectric losses to partially absorb microwave energy and generate heat around the glass being processed.

The method is energy efficient because most of the energy consumed is absorbed by the glass being processed. Any furniture used in the microwave processing chamber can be made of microwave transparent material such that almost no energy is lost to the heating of the furniture.

The glass used in forming the glass-ceramic presents optimal conditions to absorb microwave energy and dissipates this energy as volumetric heat. This heating introduces less thermal stresses in the material than surface heating. Also, because the heating is volumetric, i.e., at different depths within the volume of the glass, high heating rates can be reached.

The microwave processing method has been used to form glass-ceramic in times that are about 70% to 75% shorter than the processing times used in real production lines with conventional resistive heating.

The summary above is intended to provide an introduction to the invention. It is not intended to identify key or critical elements of the invention or to delineate the scope of the invention. Various embodiments of the invention will be described in more detail below with reference to the accompanying drawings.

BRIEF DESCRIPTION OF DRAWINGS

The following is a description of the figures in the accompanying drawings. The figures are not necessarily to scale, and certain features and certain views of the figures may be shown exaggerated in scale or in schematic in the interest of clarity and conciseness.

DESCRIPTION OF EMBODIMENTS

In the following description, numerous specific details may be set forth in order to provide a thorough understanding of various embodiments of the invention. However, it will be clear to one skilled in the art when the invention may be practiced without some or all of these specific details. In other instances, well-known features or processes may not be described in detail. In addition, like or identical reference numerals may be used to identify common or similar elements.

A method of producing glass-ceramic involves use of microwave heat treatment for both nucleation and crystallization of a base glass. In one illustrative embodiment, the glass from which the glass-ceramic is derived is one in which a solid solution of β-quartz or β-spodumene can be formed as a main crystalline phase. In one illustrative embodiment, the glass composition from which the glass is made comprises $SiO_2$, $Al_2O_3$, and $Li_2O$ as essential components. The glass composition further comprises at least one nucleating agent. In one illustrative embodiment, the glass composition comprises $TiO_2$ as a nucleating agent. $ZrO_2$ is another example of a nucleating agent and may used together with or in lieu of $TiO_2$. The glass composition may further include other components that may enhance or impart certain desirable properties to the glass. In one illustrative embodiment, a glass formed from a glass composition falling within the compositional ranges shown in Table 1 is used to form the glass-ceramic.

TABLE 1

| Component | Range (weight %) |
|---|---|
| $SiO_2$ | 45-66 |
| $SnO_2$ | 0-1 |
| MgO | 0-2 |
| $Al_2O_3$ | 12-21 |
| $Li_2O$ | 2-4 |
| $B_2O_3$ | 0-3 |
| ZnO | 0-3 |
| $TiO_2$* | 2-5 |
| FeO | 0-3 |

*A different nucleating agent may be used in lieu of or in addition to $TiO_2$

Figure 1:
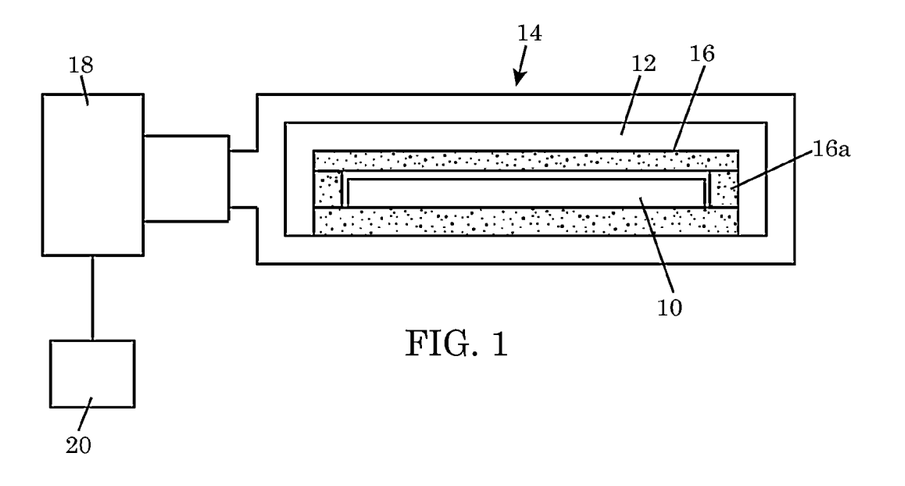
FIG. 1 is a schematic of a setup for producing a glass-ceramic article.

FIG. 1 shows an illustrative embodiment where a glass article 10 is disposed in a processing chamber 12 of a variable frequency microwave applicator 14. The glass article 10 is made from a glass as described above. An enclosure structure 16 is formed around the glass article 10. The walls 16a of the enclosure structure 16 are made of a thermally insulating and microwave transparent material, such as porous aluminum silicate. A microwave power source 18 is coupled to the processing chamber 12 and operable to deliver microwaves to the processing chamber 12. A controller 20 controls the microwave power source 18 to deliver microwaves to the processing chamber 12 at varying (multiple) frequencies in a range from 5.4 GHz to 7.0 GHz. The controller 20 also regulates the microwave power source 18 to deliver microwaves to the processing chamber 12 at a power level based on a predefined glass-ceramic processing schedule. The controller 20 may receive temperature measurements from appropriate sensors, such as thermocouples, arranged to monitor the temperature of the glass article 10 in the processing chamber 12.

The microwaves delivered to the processing chamber 12 at varying frequencies induce different distributions of microwave fields in the glass article 10. The induced microwave fields heat the glass article 10 at different penetration depths according to the range of frequencies applied. The glass article 10 can be heated by the microwave fields because the glass article 10 is made from a glass that is at least a partial microwave absorber. The enclosure structure 16, because of its transparency to microwaves, does not hinder the microwave fields from being induced in the glass article 10. At the same time, the enclosure structure 16, because of its thermally insulating property, will promote uniform thermal distribution in the glass article 10.

To form the glass-ceramic, the processing chamber 12 is closed. Then, the controller 20 and microwave power source 18 are operated to induce microwave fields in the glass article 10 that heat the glass article 10 from an initial temperature, typically room temperature, to a nucleation temperature. For the glass described above, the nucleation temperature may be in a range from 770° C. to 850° C. Heating to nucleation temperature may involve a single heating rate or multiple heating rates. For example, in the case of the multiple heating rates, the glass article may be heated from the initial temperature to an intermediate temperature at a relatively high rate, e.g., 15° C./min to 25° C./min, and from the intermediate temperature to the nucleation temperature at a relatively low rate, e.g., 6° C./min to 12° C./min. The slower heating rate may be used for the final 100° C. to 150° C. of the heating, for example. It is also possible to heat the glass article from the initial temperature to the intermediate temperature using infrared heating. Microwave heating can then be used to heat the glass article from the intermediate temperature to the nucleation temperature.

After the glass article 10 reaches the nucleation temperature, the controller 20 and microwave power source 18 operate to induce microwave fields in the glass article 10 that maintains the glass article 10 at the nucleation temperature for a time period during which crystal nuclei develop in the glass article 10. As an example, nucleation time may be about 15 to 20 minutes long.

After the nucleation, the controller 20 and microwave power source 18 operate to induce microwave fields in the glass article 10 that heats the glass article 10 from the nucleation temperature to a crystallization temperature. To form crystals of a solid solution of β-spodumene in the glass, the crystallization temperature may be in a range from 950° C. to 1100° C. A lower crystallization temperature may be used if the desire is to form a solid solution of β-quartz as a main crystalline phase in the glass.

After the glass article 10 reaches the crystallization temperature, the controller 20 and microwave power source 18 operate to induce microwave fields in the glass article 10 that maintains the glass article 10 at the crystallization temperature for a time period during which at least one crystal phase grows in the glass. In one embodiment, the crystallization temperature is such that a solid solution of β-spodumene is formed as a main crystalline phase in the glass. The crystallization period may be about 30 to 40 minutes long. At the end of the crystallization period, the glass article 10 has become a glass-ceramic article.

After the crystallization, the glass-ceramic article is cooled from the crystallization temperature to room temperature. In one illustrative embodiment, the microwave power source 18 is controlled to deliver microwaves to the processing chamber 12 during an initial phase of the cooling. This is to allow the temperature of the glass-ceramic article to ramp down in a controlled manner. As an example, the ramp down rate during this initial cooling phase may be about −6° C./min to −12° C./min. The temperature of the glass-ceramic may drop by about 5% to 20% of the crystallization temperature during this microwave-assisted cooling period. Afterwards, the microwaves are turned off and the processing chamber 12 is opened. At least a portion of the enclosure structure 16 is removed to allow air to be delivered to the glass-ceramic. The glass-ceramic is then rapidly cooled down to room temperature by the forced-air cooling. This rapid cooling is possible without inducing thermal shock in the glass-ceramic because of the very low thermal expansion of the glass-ceramic.

Figure 2:
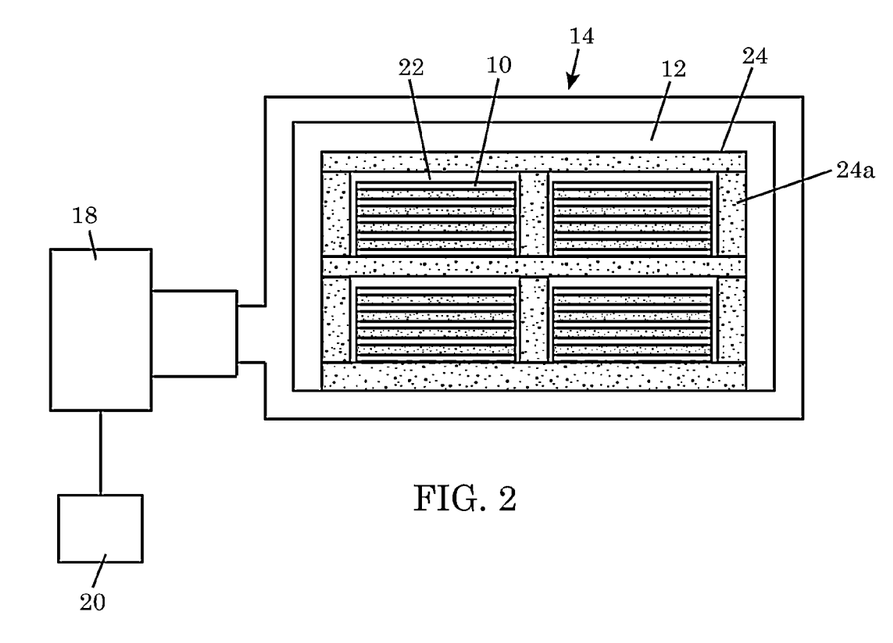
FIG. 2 a schematic of a setup for producing several glass-ceramic articles.

The setup shown in FIG. 1 may be reconfigured to process multiple glass articles. An illustrative embodiment is shown in FIG. 2, where stacks 22 of glass articles 10 are arranged in an enclosure structure (or furniture) 24 in the processing chamber 12. The walls of the enclosure structure 24a are made of thermally insulating and microwave transparent material, as in the case of the enclosure structure 16 in FIG. 1. The glass articles 10 in each stack 22 may be separated (or interleaved) by microwave transparent materials.

In one embodiment, a glass-ceramic formed from a glass as described above using the microwave processing described above has β-spodumene solid solution crystals as a main crystalline phase and rutile and gahnite crystals as secondary crystalline phases. In one embodiment, the β-spodumene solid solution crystals constitute greater than 75% of the total crystalline phase of the glass-ceramic. In one embodiment, the rutile crystals constitute between 4% and 8% of the total crystalline phase of the glass-ceramic. In one embodiment, the gahnite crystals constitute between 7% and 12% of the total crystalline phase of the glass-ceramic. In one embodiment, the total crystalline phase constitutes at least 70% by volume of the glass-ceramic.

Microwaves have frequencies in the electromagnetic spectrum between 300 MHz and 300 GHz with wavelengths from 1 mm to 1 m. One of the most common characteristics of microwaves is that they can be used to heat a material from inside out. With resistive heating, the heating of a material is from the surface to the inside of the material. In the case of the glass described above, internal heating from microwaves results in a rapid and uniform heating of the glass, reducing the input energy needed to make the glass-ceramic compared to the conventional resistive heating.

Materials are classified generally into four categories—transparent, opaque, absorbing, and partially absorbing—based on their degree of interaction with microwaves. Transparent materials do not absorb any significant amount of energy when microwaves pass through. Pure silica is an example of a transparent material. Transparent materials can generally not be heated with microwaves. Opaque materials reflect microwaves. In the frequencies of interest in this disclosure, metals as a bulk are good examples of opaque materials. Metals as bulk generally cannot be heated with microwaves. Metals as powder or metal oxides, however, are mostly good microwave absorbers. Absorbing materials allow for the penetration and absorption of microwaves, usually resulting in heating of the material. Partial absorbers are a combination of one or more of the categories mentioned above and can be heated to some extent with microwaves.

The glass described above is composed of absorbing and transparent materials, which make it a partial absorber overall. When microwaves are applied to the glass, the electric field in the glass induces long and short range motions, conduction, and translation of charged particles (e.g., electrons, ions, or dipoles). The resistance to these motions due to inertial, elastic, and frictional forces causes losses and attenuation of the electromagnetic field, resulting in internal heating of the material.

An important parameter in microwave processing is the power absorbed by the material. Unlike conventional resistive heating, this parameter depends on the dielectric properties of the target material as expressed by Equation (1)

$$P_{AV} = \sigma |E|^2 = 2\pi f \varepsilon_0 \varepsilon''_{eff} |E|^2 \tag{1}$$

where:
- $P_{AV}$ is the power absorbed,
- $f$ is the microwave frequency used,
- $\sigma$ is the total electric conductivity of the material,
- $|E|$ represents the magnitude of the electric field inside the material,
- $\varepsilon_0$ is the permittivity of the free space, and
- $\varepsilon''_{eff}$ is the effective dielectric loss of the material. (It is called electric because it represents all the dielectric losses produced by different motions of the charged particles, but usually referred to just as dielectric loss.)

Equation 1 indicates that the power absorbed is affected by two groups of parameters. One group includes electric and dielectric properties of the material. The other group is related to the frequency and electric field characteristics of the microwave equipment. The glass-ceramic processing described above takes into account the interaction of these groups, as described below.

The $LiO_2$, $Al_2O_3$, and $SiO_2$ components of the glass have dielectric losses around 0.1 at room temperature in a range of microwave frequencies from 5.4 to 7.0 GHz. The dielectric losses increase as temperature increases in a range from 20° C. to 1100° C., which means that the power absorbed increases as temperature increases. However, the effective dielectric losses are still low enough in this temperature range to facilitate the absorption of the microwave energy, producing controllable heating. If the effective dielectric losses are too high, a steep rise in heating rate, referred to as thermal runaway, would be observed. Heating rate is expressed by Equation (2).

$$\frac{\Delta T}{\Delta t} = \frac{2\pi f \varepsilon_0 \varepsilon''_{eff} |E|^2}{\rho C_P} \tag{2}$$

where:
- $\Delta T/\Delta T$ is ratio of variation in temperature to variation in time, or heating rate,
- $\rho$ is bulk density,
- $C_P$ is specific heat of the material,
- $f$ is the total microwave frequency used,
- $\varepsilon_0$ is the permittivity of the free space
- $\varepsilon''_{eff}$ is the effective dielectric loss of the material, and
- $|E|$ represents the magnitude of the electric field inside the material.

The presence of metal oxides in the glass stimulates the losses due to electrical conductivity, and the high mobility of the lithium ion increases the dielectric losses. These two parameters substantially contribute to the microwave absorption of the glass.

Different components in the glass allow higher interaction (coupling) of microwaves with the glass when the microwaves are applied at varying frequencies. As the frequencies change, the distribution of the electric field will also change, allowing the microwaves to interact at different penetration depths within the entire volume of the glass. This heightened interaction will reduce the thermal gradients in the volume of the glass, resulting in a more uniform heating.

A study was carried out to compare the glass-ceramic forming process described above where nucleation and crystallization are carried out by means of microwaves and the conventional glass-ceramic forming process where nucleation and crystallization are carried out by means of resistive heating.

EXAMPLE 1

A glass was made from the glass composition shown in Table 2 below.

TABLE 2

| Component | Weight % | Component | Weight % |
| --- | --- | --- | --- |
| $SiO_2$ | 63.04 | $B_2O_3$ | 2.0 |
| $Al_2O_3$ | 20.25 | MgO | 1.8 |
| $TiO_2$ | 4.6 | FeO | 1.8 |
| $Li_2O$ | 3.6 | $SnO_2$ | 0.46 |
| ZnO | 2.45 | | |

EXAMPLE 2

A set of samples of the glass made in Example 1 was obtained. Each glass sample in the set was placed and maintained in an enclosing structure inside a processing chamber of a variable frequency microwave applicator. The walls of the enclosing structure were made of porous aluminum silicate, which is a thermal insulator and microwave transparent material. The glass sample was processed according to the sequence of steps in Table 3 below.

TABLE 3

| Step | Parameters | Values |
| --- | --- | --- |
| 1 | Central frequency (MHz) | 6250 |
| 2 | Band width (MHz) | 800 |
| 3 | Sweep time (100 ms) | 100 |
| 4 | Heat up ramp 1 (° C./min) | 20 |
| 5 | Temperature at which heat up ramp changes | 780 |
| 6 | Heat up ramp 2 (° C./min) | 8 |
| 7 | Nucleation temperature (° C.) | 830 |
| 8 | Nucleation time (min) | 15 |
| 9 | Heat up ramp 3 (° C./min) | 15 |
| 10 | Temperature at which heat up ramp changes (° C.) | 1030 |
| 11 | Heat up ramp 4 (° C./min) | 8 |
| 12 | Crystallization temperature | 1050 |
| 13 | Crystallization time (min) | 30 |
| 14 | Cool down ramp 1 (° C./min) | −8 |
| 15 | Temperature ramp changes (° C.), microwaves turn off | 900 |
| 16 | Cool down ramp 2 (° C./min) | 14 |
| 17 | Temperature at which cool down ramp changes (° C.) | 700 |
| 18 | Cool down ramp 3 (° C./min) until room temperature | −40 |

Table 3 indicates that the sample received a microwave heat treatment following a sequence of steps 1 to 15. Steps 14 and 15 are part of the cooling down cycle, but microwaves were still applied to maintain a slowdown ramp in temperature of the glass-ceramic. The cooling cycle without microwaves started after step 15. For the remainder of the cooling cycle, the microwave energy was turned off and the wall of the enclosing structure above the sample was removed. A device was then used to blow air on the sample through the open section of the enclosing structure.

Figure 3:
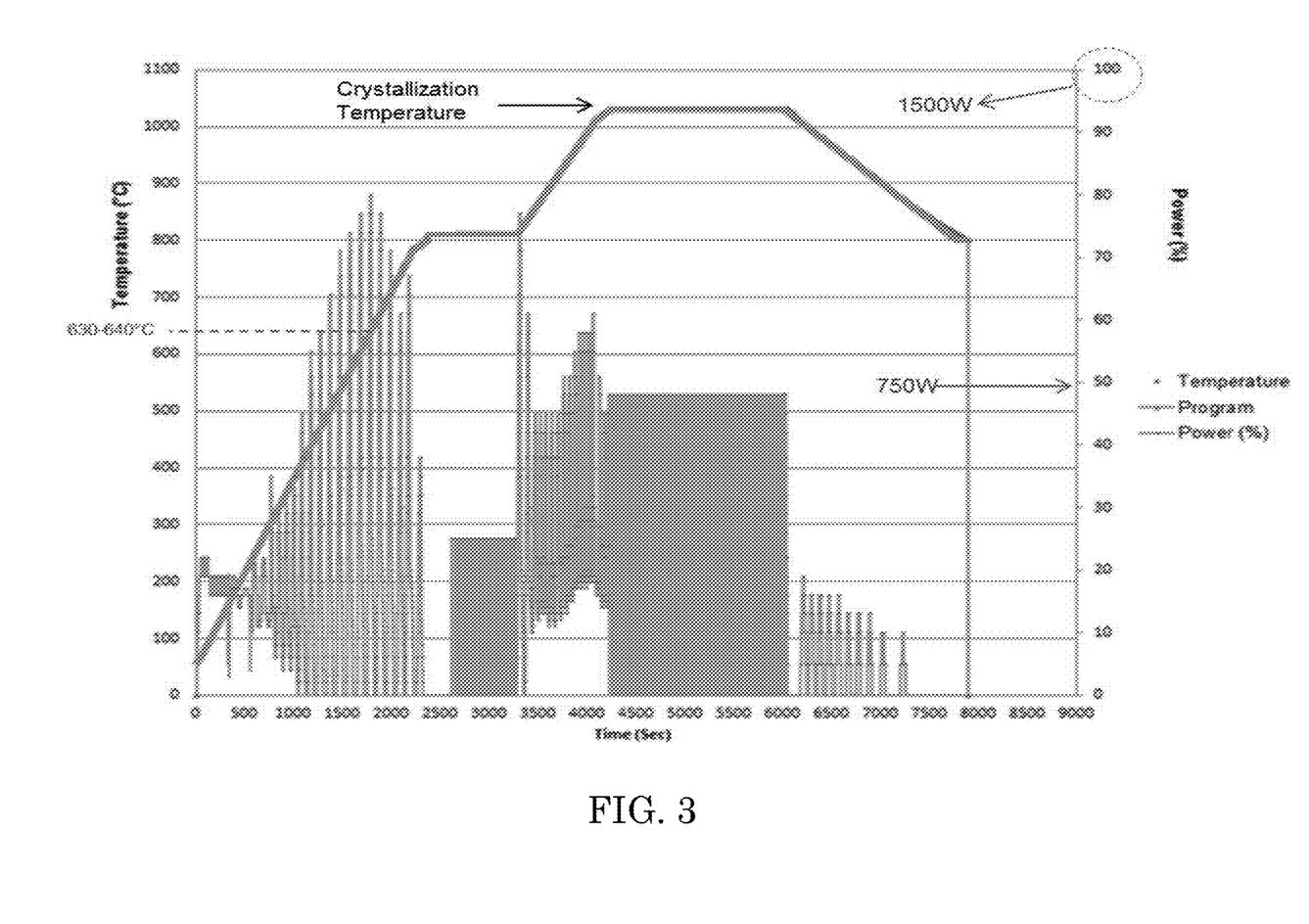
FIG. 3 is a temperature profile of a microwave glass-ceramic forming process.

Thermocouples were used to monitor and control the temperature profile of the sample during the glass-ceramic processing. The thermocouples were installed on the bottom of the sample and were properly grounded to the frame of the microwave processing chamber to avoid electromagnetic interference from the microwave field. FIG. 3 shows a temperature profile of the process and the power used to perform the schedule. The temperature profile does not include the portion of the cooling stage where microwaves were not used.

The steps in Table 3 above were repeated for another set of samples of the glass made in Example 1 with a different set of processing parameters.

Table 4 shows a summary of nucleation and crystallization parameters used in this example.

TABLE 4

| Nucleation | | Crystallization | |
| --- | --- | --- | --- |
| Temperature (C.) | Time (min) | Temperature (C.) | Time (min) |
| 830 | 15 | 1050 | 30 |
| 830 | 15 | 1030 | 30 |

EXAMPLE 3

A set of samples of the glass made in Example 1 was processed to form glass-ceramics using conventional resistive heating techniques.

Table 5 shows a summary of nucleation and crystallization parameters used in this example.

TABLE 5

| Nucleation | | Crystallization | |
| --- | --- | --- | --- |
| Temperature (C.) | Time (min) | Temperature (C.) | Time (min) |
| 780 | 120 | 975 | 240 |
| 780 | 60 | 990 | 120 |
| 830 | 15 | 1050 | 30 |

Figure 4:
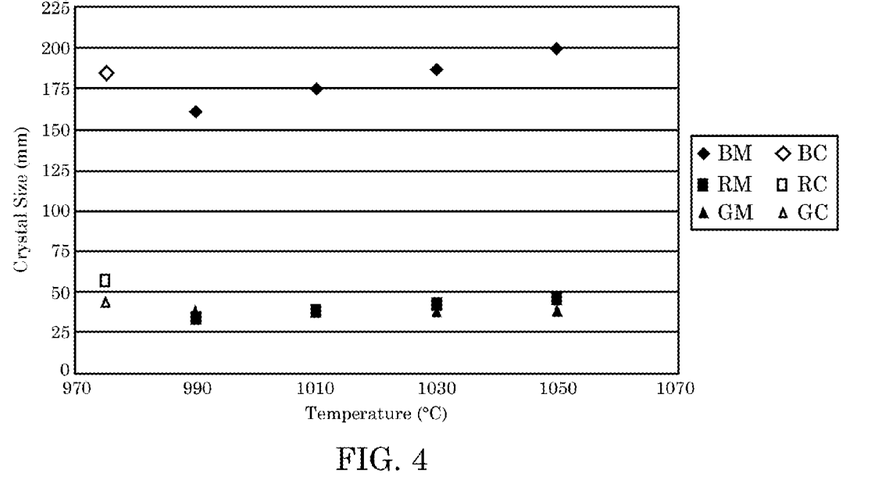
FIG. 4 is a plot showing crystal sizes of each phase in glass-ceramics formed by microwave processing and conventional processing.

An X-ray diffraction analysis was carried out to characterize the microstructure of the glass-ceramics formed according to Examples 2 and 3. Table 6 shows the percent crystalline phases of glass-ceramics from Example 2 and 3 having similar β-spodumene crystal sizes. FIG. 4 shows the glass crystal sizes as a function of crystallization temperature for the method of Example 2 and the method of Example 3. In FIG. 4, BM, RM, and GM represents β-spodumene, rutile, and gahnite, respectively, from microwave processing, and BC, RC, and GC represents β-spodumene, rutile, and gahnite from conventional processing, respectively. The cycle time for the conventional processing of FIG. 4 was 10 hours. The nucleation temperature and cycle time for the microwave processing of FIG. 4 was 830° C. and 2.5 hours, respectively.

TABLE 6

| | A (Conventional) | B (Microwave) |
| --- | --- | --- |
| Processing Cycle | nucleation at 780° C. for 2 hours and crystallization at 980° C. for 4 hours; total cycle ~10 h | nucleation at 830° C. for 15 min and crystallization at 1030° C. for 30 min; total cycle ~2.5 h |
| % β-spodumene phase, β-spodumene crystal size (nm) | 85, 186 | 85.7, 188 |

TABLE 6-continued

|  | A (Conventional) | B (Microwave) |
|---|---|---|
| % gahnite phase, gahnite crystal size (nm) | 9.2, 44 | 8.4, 43 |
| % rutile phase, rutile crystal size (nm) | 6.0, 58 | 5.8, 38 |

A lab color analysis was carried out to characterize the color control of the glass-ceramics formed according to Examples 2 and 3. The color data was obtained using an X-Rite Ci7 photo spectrometer and the Lab Space color technique. The Lab Space color provides three coordinates to designate color. Color coordinate a denotes the variation in color between green (a−) and red (a+). Color coordinate b denotes the variation between blue (b−) and yellow (b+). Color dimension L represents the variation in color from black (L−) to white (L+).

Figure 5A:
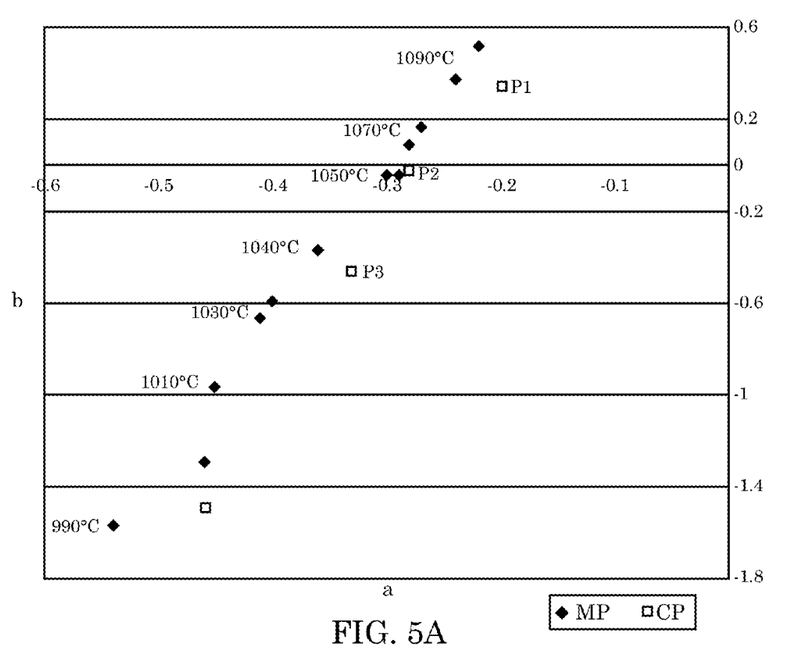
FIG. 5A is a plot showing color-opponent dimensions for glass-ceramics formed by microwave processing and conventional processing.
Figure 5B:
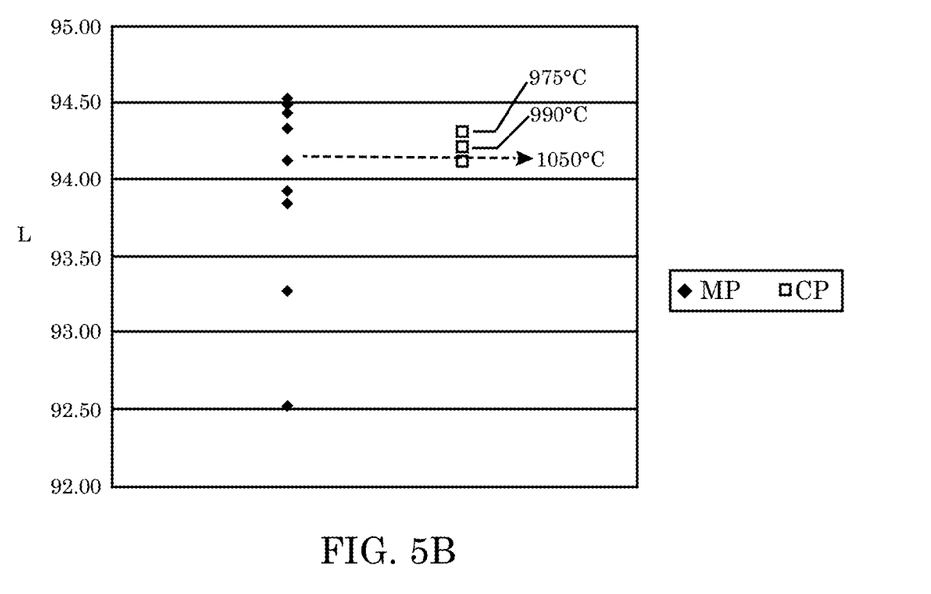
FIG. 5B is a plot showing lightness dimension for glass-ceramics formed by microwave processing and conventional processing.

FIG. 5A shows color coordinates a and b for glass-ceramics formed according to Example 2, i.e., microwave processing (MP), with processing cycle time of 2.5 hours. FIG. 5A also shows color coordinates for glass-ceramics formed according to Example 3, i.e., conventional processing (CP). In FIG. 5A, P1 represents nucleation temperature of 780° C., crystallization temperature of 975° C., and total processing cycle time of 10 hours; P2 represents nucleation temperature of 780° C., crystallization temperature of 990° C., and total processing cycle time of 7 hours; and P3 represents nucleation temperature of 830° C., crystallization temperature of 1050° C., and total processing cycle time of 3.5 hours. FIG. 5B shows color dimension L corresponding to the data of FIG. 5A.

In the microwave process, FIG. 5A shows that for a constant processing cycle time, color coordinates a and b increase with crystallization temperature. There are some discrepancies in color coordinates when two samples with similar processing parameters in microwave and conventional heating are compared, e.g., the samples at crystallization temperature of 1050° C. Overall, FIGS. 5A and 5B show that the microwave processing method of Example 2 has reliable color control over the color range that the conventional cycles of Example 3 operate (this means that the microwave processing method is comparable to the conventional method in terms of color control). This reliable color control in the microwave processing is achieved with a much shorter processing cycle time compared to the conventional processing.

Although it is possible to achieve color control with the 3.5 hour conventional cycle, it should be noted that this short cycle comes at some cost. High volume production requires the use of furniture inside the processing chamber, as illustrated in FIG. 2. In a conventional resistive heating process, it is desirable that the furniture's material has a high thermal conductivity to maintain the heat uniformity inside the processing chamber so that color and microstructure of the target product are not affected. Nevertheless, furniture frequently becomes a high thermal load for the process, requiring that furnaces or kilns be designed to supply additional energy to heat this extra load. In addition, short processing cycles expose the furniture to thermal fatigue, reducing the operational life of the furniture, which in turn adds to the cost of operation. Using a microwave glass-ceramic forming process as described above, microwave transparent materials can be used as furniture. As a result, the furniture does not suffer thermal fatigue in short cycles, substantially enhancing its operational life.

FIG. 3 shows that the microwave processing of Example 2 requires an average power less than 750 W. The conventional processing required more than twice this average power because of the need to maintain the uniformity of the temperature of the entire furnace cavity. In the microwave processing, the power required decreases around the transition temperature of the glass. One explanation for this decrease in power requirement might be that the glass softens in this temperature range and the ions can increase their mobility in the microwave field dissipating higher energy. In other words, the dielectric loss rate of the glass increases such that less power is required to heat up the glass, as indicated by Equation 1.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method of producing glass-ceramic, comprising:
providing a glass made from a glass composition comprising $LiO_2$, $Al_2O_3$, $SiO_2$, and at least one nucleating agent;
disposing the glass in a microwave processing chamber;
selectively delivering microwaves into the microwave processing chamber at varying frequencies in a range from 5.4 GHz to 7.0 GHz to induce different distributions of microwave fields in the glass;
heating the glass to a nucleation temperature under the influence of the induced microwave fields;
maintaining the glass at the nucleation temperature under the influence of the induced microwave fields for a time period during which crystal nuclei develop in the glass;
heating the glass to a crystallization temperature under the influence of the induced microwave fields;
maintaining the glass at the crystallization temperature under the influence of the induced microwave fields for a time period during which at least one crystalline phase grows in the glass, thereby forming a glass-ceramic; and
cooling the glass-ceramic from the crystallization temperature to room temperature, the cooling comprising an initial phase in which microwaves are applied to the glass-ceramic, wherein a temperature of the glass-ceramic drops by 5% to 20% of the crystallization temperature during the initial phase of the cooling.

2. The method of claim 1, wherein the glass-ceramic comprises β-spodumene solid solution crystals in an amount of greater than 75% of a total crystalline phase of the glass-ceramic.

3. The method of claim 2, wherein the glass-ceramic further comprises rutile crystals and gahnite crystals in a total amount of less than 25% of the total crystalline phase of the glass-ceramic.

4. The method of claim 3, wherein the rutile crystals constitute between 4% and 8% of the total crystalline phase of the glass-ceramic and the gahnite crystals constitute between 7% and 12% of the total crystalline phase of the glass-ceramic.

5. The method of claim 2, wherein the at least one nucleating agent is $TiO_2$.

6. The method of claim 1, wherein the cooling further comprises forced air cooling of the glass-ceramic after the initial phase of cooling with microwaves.

7. The method of claim 1, wherein disposing the glass in the microwave processing chamber comprises surrounding the glass with a thermally insulating and microwave transparent material.

8. The method of claim 1, wherein the nucleation temperature is in a range from 770° C. to 850° C.

9. The method of claim 8, wherein the crystallization temperature is in a range from 950° C. to 1100° C.

* * * * *